United States Patent
Peng et al.

(10) Patent No.: US 7,304,843 B2
(45) Date of Patent: Dec. 4, 2007

(54) COOLING APPARATUS FOR COMPUTER SYSTEM

(75) Inventors: Wen-Tang Peng, Tu Cheng (TW); Jun-Xiong Zhang, Shenzhen (CN); Jia-Qi Fu, Shenzhen (CN); Zhe Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,583

(22) Filed: Apr. 8, 2006

(65) Prior Publication Data

US 2007/0064386 A1    Mar. 22, 2007

(30) Foreign Application Priority Data

Sep. 21, 2005 (CN) .................. 2005 2 0064971

(51) Int. Cl.
*H05K 7/00* (2006.01)
(52) U.S. Cl. ....................... 361/687; 361/695
(58) Field of Classification Search ............... 361/687, 361/695
See application file for complete search history.

(56) References Cited

U.S. PATENT DOCUMENTS

| | | | |
|---|---|---|---|
| 6,115,250 A * | 9/2000 | Schmitt | 361/695 |
| 6,373,698 B1 * | 4/2002 | Christensen | 361/695 |
| 6,435,889 B1 | 8/2002 | Vinson et al. | |
| 6,556,437 B1 * | 4/2003 | Hardin | 361/687 |
| 6,565,163 B2 * | 5/2003 | Behl et al. | 312/223.1 |
| 6,587,342 B1 * | 7/2003 | Hsu | 361/695 |
| 6,592,327 B2 | 7/2003 | Chen et al. | |
| 6,839,233 B2 * | 1/2005 | Cravens et al. | 361/695 |
| 2003/0099094 A1 * | 5/2003 | Coles et al. | 361/726 |
| 2006/0203446 A1 * | 9/2006 | Radhakrishnan et al. | 361/695 |

FOREIGN PATENT DOCUMENTS

| | | |
|---|---|---|
| TW | 257611 | 2/2005 |
| TW | 258566 | 3/2005 |

\* cited by examiner

*Primary Examiner*—Jayprakash Gandhi
*Assistant Examiner*—Ingrid Wright
(74) *Attorney, Agent, or Firm*—Wei Te Chung

(57) ABSTRACT

A mounting apparatus for a fan includes a bracket, and a fan lid. The bracket includes two opposite locking plates for holding the fan therebetween. Each of the locking plates defines a locking hole therein. The fan lid includes a body attached to the fan, and a pair of resilient securing portions extending from the body. Each of the securing portions includes a vertical portion that protrudes a protrusion for being engaged in a corresponding locking hole of the bracket, and a horizontal portion forming an operation member for being pulled when disassembling the fan from the bracket.

12 Claims, 4 Drawing Sheets

COOLING APPARATUS FOR COMPUTER SYSTEM

FIELD OF THE INVENTION

The present invention relates to cooling apparatuses, and particularly to a cooling apparatus having a fan that can be easily inserted and removed from a computer system housing.

DESCRIPTION OF RELATED ART

Generally, heat dissipation devices are used in many systems which generate heat for keeping the system working within a range of normal working temperature. A heat dissipation device may be a fan, a heat pipe, a heat sink or a combination thereof. Whatever it is, it is often required to conveniently assembling the heat dissipation device to the system.

A fan, as a heat dissipation device, is often used in a personal computer, a workstation, a router or a server for heat dissipation. Usually, the fan is directly attached to a heat sink or an enclosure by screws. However, it is complicated to attach or detach the fan. Especially in some occasions, it is required to assemble the fan to a bracket that is mounted to a system such as a server or a router, for easily assembling the fan to the system. It is important to make the assembling process easy in mass production, for it can save so much working time that cost is reduced.

What is needed is to provide a cooling apparatus which overcomes the above-mentioned problems.

SUMMARY OF INVENTION

An exemplary mounting apparatus for a fan includes a bracket, and a fan lid. The bracket includes two opposite locking plates for holding the fan therebetween. At least one of the locking plates defines a locking hole therein. The fan lid includes a body attached to the fan, and at least a resilient securing portion extending from the body. Said securing portion includes a vertical portion that protrudes a protrusion for being received in said locking hole of the bracket, and a horizontal portion forming an operation member.

Other advantages and novel features of the invention will become more apparent from the following detailed description when taken in conjunction with the accompanying drawings, in which:

DETAILED DESCRIPTION

Figure 1:
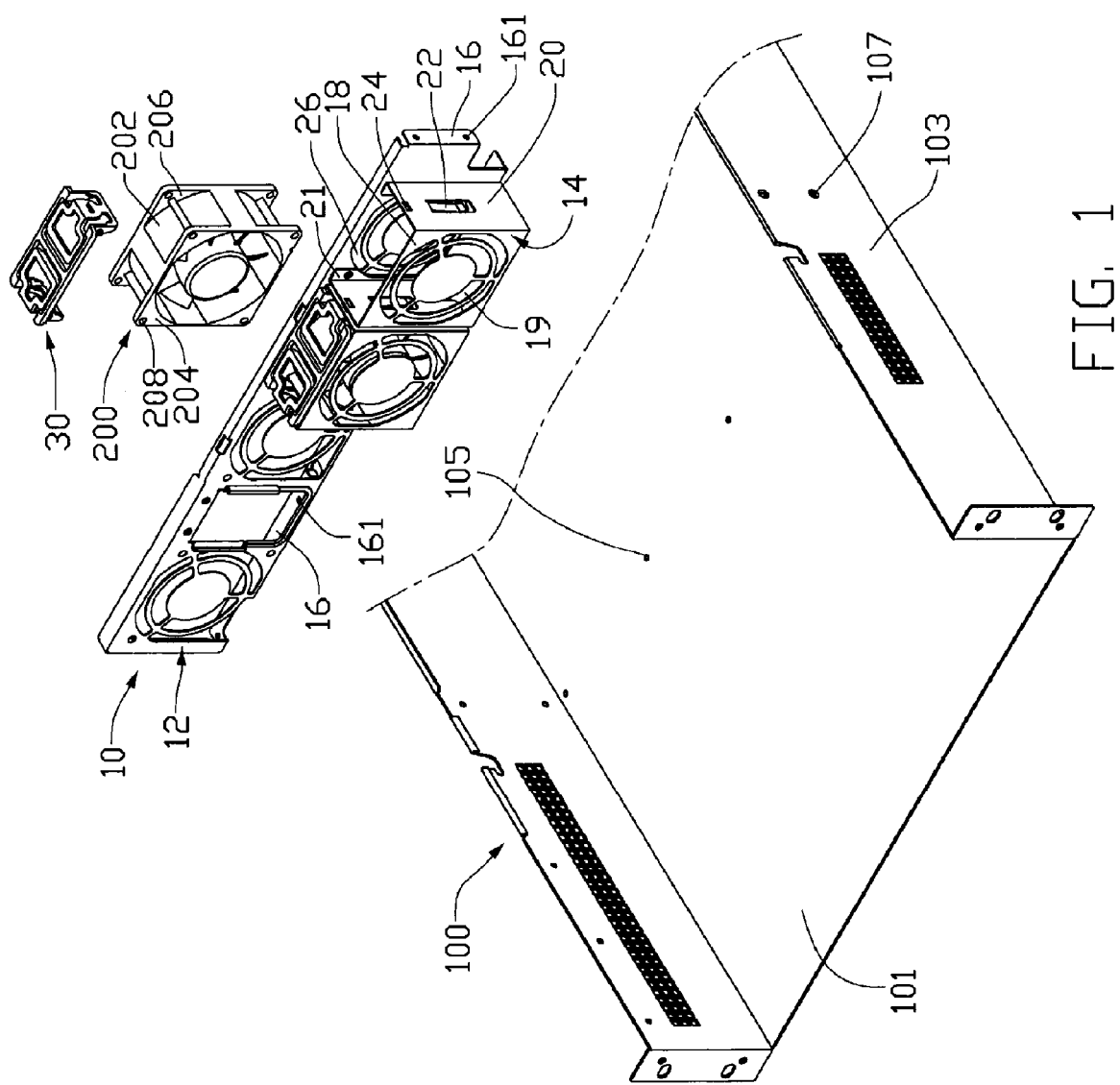
FIG. 1 is an exploded, isometric view of a cooling apparatus for a computer system in accordance with a preferred embodiment of the present invention, the cooling apparatus includes a chassis, a bracket, a fan, and a fan lid.

Referring to FIG. 1, a cooling apparatus of a computing/computer system in accordance with a preferred embodiment of the present invention includes a chassis 100, a bracket 10, a fan 200, and a fan lid 30.

The chassis 100 includes a bottom wall 101, and a pair of sidewalls 103 extending upwardly from opposite sides of the bottom wall 101. A plurality of first mounting holes 105,107 is defined in the bottom wall 101 and the sidewalls 103.

The bracket 10 includes a mounting plate 12, and a holder 14. Three flanges 16 are bent from a bottom and two opposite sides of the mounting plate 12. A plurality of second mounting holes 161 is defined in the flanges 16, corresponding to the first mounting holes 105, 107 of the chassis 100. A plurality of first vents 26 is defined in the mounting plate 12. The holder 14 includes a base plate 18 parallel to the mounting plate 12, and a pair of locking plates 20 extending perpendicularly from opposites sides of the base plate 18. An edge 21 is bent perpendicularly from a distal end of each locking plate 20 for mounting the holder 14 to the mounting plate 12. A plurality of second vents 19 is defined in the base plate 18 aligning with the first vents 26 of the mounting plate 12. A locking hole 24 is defined in an upper portion of each locking plate 20. A resilient tab 22 is stamped from each locking plate 20.

The fan 200 includes a generally circular center region 202 as well as sides 204 and 206. A plurality of apertures 208 is preferably defined in the fan 200 and is generally positioned proximate the respective corners of sides 204 and 206.

Figure 2:
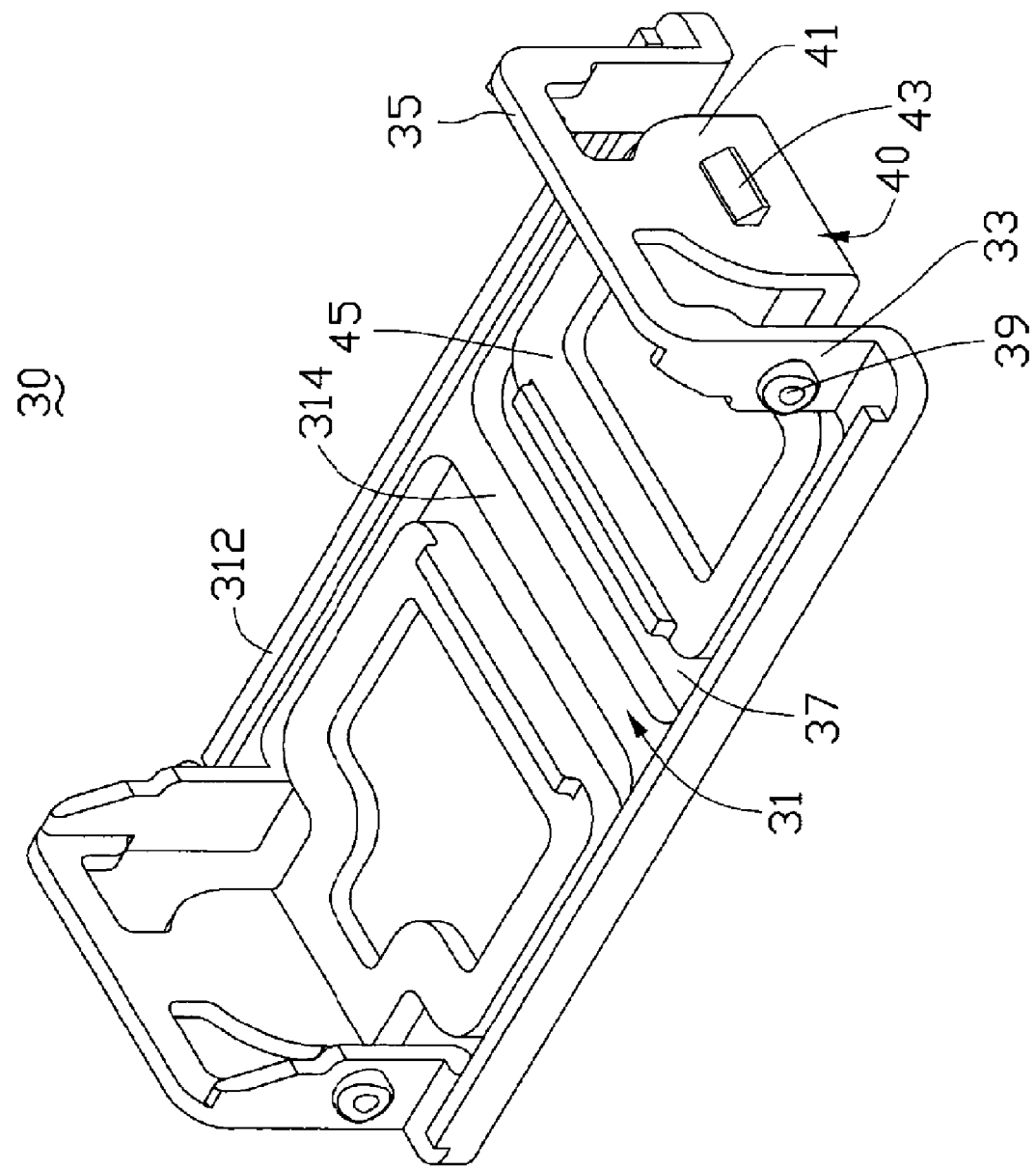
FIG. 2 is an isometric view of the fan lid of FIG. 1, but viewed from another aspect.

Referring also to FIG. 2, the fan lid 30 includes a body 31. The body 31 includes two parallel bars 312, and a connecting portion 314 connecting middles of the bars 312. A pair of openings 37 is defined between the connecting portion 314 and the bars 312 at opposite ends of the body 31. An arm 33 extends from each bar 312. A beam 35 is connected to distal ends of two arms 33 at each end of the body 31. A shaft 39 extends outwardly from each arm 33 for being received in a corresponding aperture 208 of the fan 200. An L-shaped securing portion 40 extends upwardly from each beam 35. Each securing portion 40 includes a vertical portion 41 protruding a protrusion 43 for being engaged in the locking hole 24 of the bracket 10, and a horizontal portion extending into a corresponding opening 37 from a distal end of the vertical portion 41. The horizontal portion forms a ring operation member 45.

Figure 3:
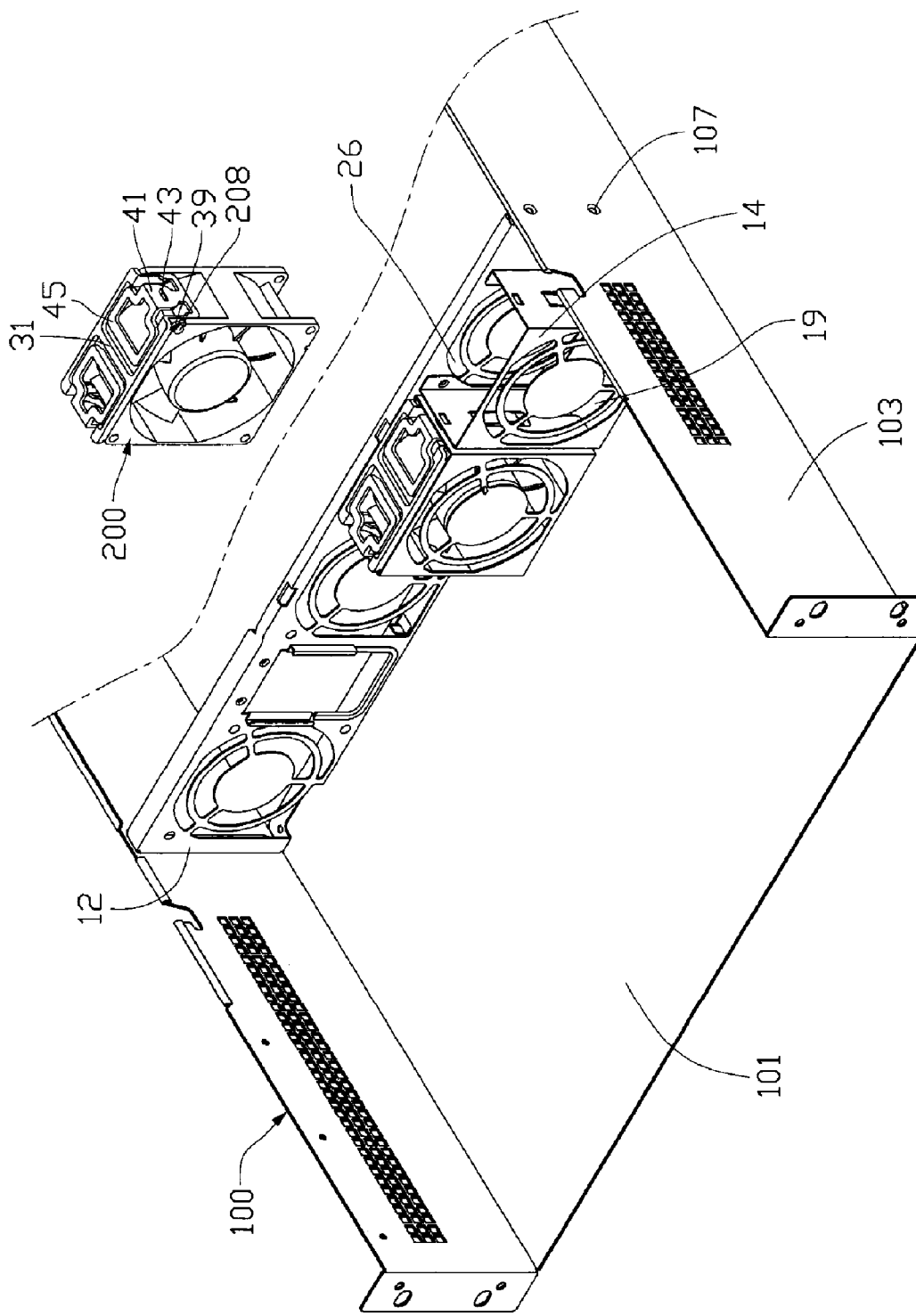
FIG. 3 is similar to FIG. 1, but showing the bracket being mounted to the chassis, and the fan lid being mounted to the fan.
Figure 4:
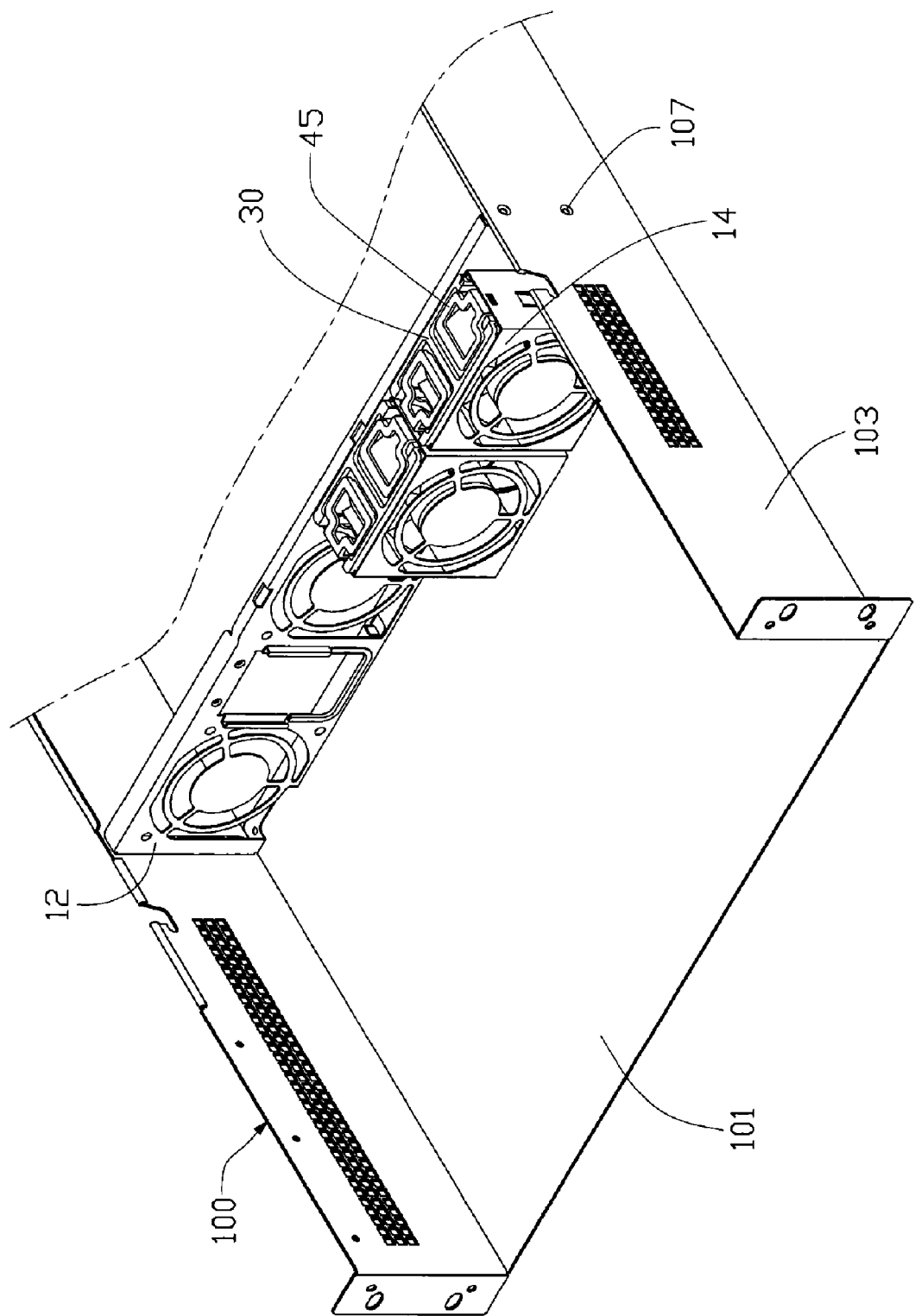
FIG. 4 is an assembled view of FIG. 1.

Referring also to FIGS. 3 and 4, in assembling the bracket 10 to the chassis 100, a plurality of fasteners (not shown), such as rivets are inserted through the first mounting holes 105, 107, and the second mounting holes 161 to fix the bracket 10 to the chassis 100. In assembling the fan lid 30 to the fan 200, the shafts 39 of the fan lid 30 are engaged in the corresponding apertures 208 of the fan 200. The body 31 of the fan 30 is perpendicularly to the sides 204 and 206.

The combined fan 200 and fan lid 30 is inserted in the holder 14 of the bracket 10. The side 204 faces the base plate 18 of the holder 14. The side 206 faces the mounting plate 12. The protrusions 43 are engaged with the corresponding locking holes 24 of the holder 14. Thus, the fan 200 is secured. The tabs 22 of the holder 14 hold the fan 200 elastically.

In disassembly, the operation members 45 of the fan lid 30 are lifted to rotate toward the corresponding locking plates 20. The protrusions 43 are disengaged from the corresponding locking holes 24 of the holder 14. Thus, the combined fan 200 and fan lid 30 can be pulled upwardly from the holder 14.

It is believed that the present embodiment and its advantages will be understood from the foregoing description, and it will be apparent that various changes may be made thereto without departing from the spirit and scope of the invention or sacrificing all of their material advantages, the example hereinbefore described merely being preferred or exemplary embodiment of the invention.

What is claimed is:

1. A mounting apparatus for a fan, comprising:
   a bracket comprising two opposite locking plates for holding the fan therebetween, at least one of the locking plates defining a locking hole in an upper portion thereof; and
   a fan lid located within a space defined between the two locking plates of the bracket when the fan is assembled to the bracket, and comprising a body attached to the fan, and
   at least a resilient securing portion extending from the body, said securing portion comprising a vertical portion extending along a corresponding vertical side of the fan, and
   a cantilevered horizontal portion extending horizontally from a top of the vertical portion and located at a top side of the fan, the vertical portion having a protrusion thereon engaged in said locking hole of the bracket, the horizontal portion acting as an operation member being pulled to disengage the protrusion from said locking hole of the bracket when disassembling the fan, wherein said locking hole comprises a pair of locking holes defined in the locking plates, respectively, the fan lid comprises a pair of securing portions extending from the body, a pair of protrusions protrudes from the securing portions for being engaged in the corresponding locking holes, wherein the body comprises two parallel bars, and a connecting portion connecting middles of the bars, two openings for receiving the corresponding operation members therein are formed between the bars and at opposite sides of the connecting portion respectively.

2. The mounting apparatus as claimed in claim 1, wherein the body further comprises two pairs of arms extending downwardly from ends of the corresponding bars, and two beams connecting distal ends of the corresponding pairs of arms, the vertical portion of each of the securing portions extends upwardly from a corresponding beam.

3. The mounting apparatus as claimed in claim 2, wherein the fan comprises a center region as well as two sides, a plurality of apertures is defined in the fan and are generally positioned proximate the respective corners of sides, a shaft is extended from each of the arms of the fan lid for being engaged in a corresponding aperture.

4. The mounting apparatus as claimed in claim 3, wherein a pair of resilient tabs is stamped from the locking plates for holding the fan elastically.

5. A cooling apparatus for a computer system, comprising:
   a fan;
   a chassis comprising a bottom wall;
   a bracket comprising a mounting plate mounted to the bottom wall of the chassis, and a holder mounted to the mounting plate for holding the fan therein, the holder comprising two opposite locking plates, at least one of the locking plates defining a locking hole therein; and
   a fan lid comprising a body mounted to the fan, and at least a resilient securing portion extending from the body, said securing portion comprising a vertical portion extending along a corresponding vertical side of the fan, and a cantilevered horizontal portion extending horizontally from a top of the vertical portion and located at a top side of the fan, the vertical portion having a protrusion thereon engaged in said locking hole of the bracket, the horizontal portion acting as an operation member for being pulled to disengage the protrusion from the locking hole of the holder when disassembling the fan from the bracket, wherein said locking hole comprises a pair of locking holes defined in the locking plates, respectively, the fan lid comprises a pair of locking holes defined in the locking plates, respectively, the fan lid comprises a pair of securing extending from the body, a pair of protrusions protrudes from the securing portions for being engaged in the corresponding locking holes, wherein the body comprises two parallel bars, and a connecting portion connecting middles of the bars, two openings for receiving the corresponding operation members are defined between the bars at opposite sides of the connecting portion respectively.

6. The cooling apparatus as claimed in claim 5, wherein the body further comprises two pairs of arms extending from ends of the corresponding bars, and two beams connecting distal ends of the corresponding pairs of arms, the vertical portion of each of the securing portions extends upwardly from a corresponding beam, the horizontal portion extends into a corresponding opening from a distal end of the vertical portion toward the connecting portion.

7. The cooling apparatus as claimed in claim 6, wherein the fan comprises a center region as well as two sides, a plurality of apertures is defined in the fan and are generally positioned proximate the respective corners of sides, a shaft is extended from each of the arms of the fan lid for being engaged in a corresponding aperture.

8. The cooling apparatus as claimed in claim 7, wherein a pair of resilient tabs is stamped from the locking plates for holding the fan elastically.

9. The cooling apparatus as claimed in claim 5, wherein a plurality of first vents is defined in the mounting plate, the holder further comprising a base plate opposite to the mounting plate and connecting the locking plates, a plurality of second vents is defined in the base plate.

10. A computing system comprising:
    a chassis enclosing said computing system therein;
    a bracket removably installable in said chassis, and defining at least one space therein;
    a fan removably receivable in a selective one of said at least one space of said bracket, and defining a side thereof exposable to an outside of said bracket when said fan is completely received in said space; and
    a fan lid removably attachable to said side of said fan and reachably engagable with said bracket so as to secure said fan in said bracket when said fan is completely received in said space, said fan lid comprising two cantilevered operation members extending from two opposite ends of said fan lid toward each other so that free ends of said two operation members are close to each other significantly, and said two operation members restorably movable relative to said fan along said side of said fan so as to disengage said fan lid from said bracket for releasing said fan away from said bracket, wherein said two operation members are ring-shaped respectively, and at least one ring edge of one of said two operation members and at least one ring edge of the other of said two operation members are located in said fan lid side by side closely for operation.

11. The mounting apparatus as claimed in claim 1, wherein the operation member is pulled to disengage the protrusion along a direction parallel to an extending direction of the horizontal portion of the fan lid.

12. The cooling apparatus as claimed in claim 5, wherein the operation member is pulled to disengage the protrusion along a direction parallel to an extending direction of the horizontal portion of the fan lid.

* * * * *